May 14, 1957
H. G. CARPENTER
2,792,495
ELECTRIC LOGIC CIRCUITS
Filed Jan. 27, 1953
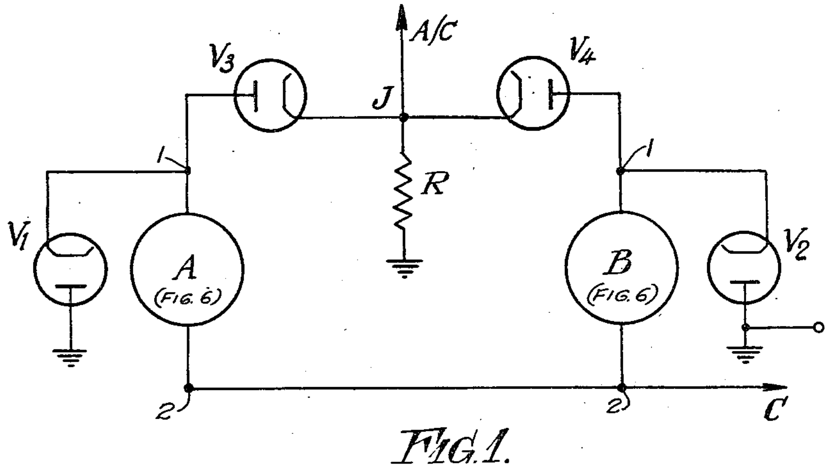
FIG. 1.
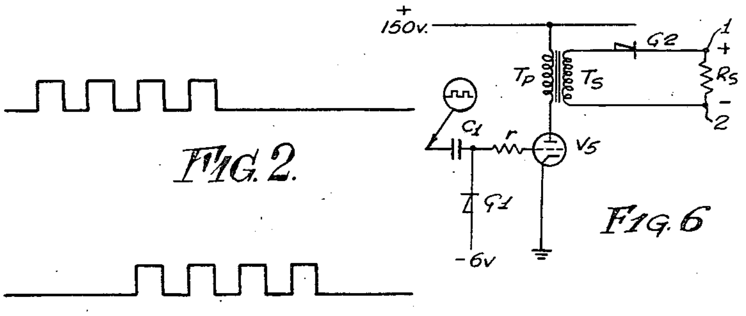
FIG. 2, FIG. 6
FIG. 3.
FIG. 4.
FIG. 5.
INVENTOR
HENRY GEORGE CARPENTER
BY
Bailey, Stephens & Huettig
ATTORNEYS

United States Patent Office 2,792,495

Patented May 14, 1957

2,792,495

ELECTRIC LOGIC CIRCUITS

Henry George Carpenter, New Milton, England, assignor to Elliott Brothers (London) Limited, London, England, a British company Application January 27, 1953, Serial No. 333,532

6 Claims. (Cl. 250—27)

This invention relates to electrical circuits such as are used in electronic digital computers and is concerned more particularly with so-called "logical" circuits to which are applied as inputs a number of pulse trains each representing a number or a logical proposition and from which are obtained as outputs electrical pulse trains representing the results of arithmetical operations or logical deductions.

In such computing and similar apparatus there is frequently required a circuit of the character (hereinafter referred to as being "of the character refered to") which when supplied with two input pulse trains will produce a pulse in one output, termed the "coincidence" output, when and only when there are pulses in the inputs simultaneously, and will produce a pulse in another output, termed the "anti-coincidence" output, when and only when there is a pulse in one or other of the inputs.

It is an object of the present invention to provide a simple circuit of few components which shall satisfy the requirements just mentioned.

According to the invention, such a circuit comprises two pulse generators of low output impedance, each having a floating two-terminal output and each being driven from one of the two input pulse trains, a connection from the positive-going terminal of each generator to earth through a non-linear element arranged to conduct only if the respective terminal tends to go below earth potential, two further non-linear elements connected in series opposition between the said positive-going terminals and having a resistive load connected from their junction to earth, each of these elements being arranged to conduct only when the respective terminal tends to rise above earth potential, a common connection from the negative-going terminals of the generators to constitute the coincidence output, and a connection from the junction of the series-connected non-linear elements to constitute the anti-coincidence output.

The resistive load connected to earth from the junction of the series-connected non-linear elements should present a comparatively low impedance whereas the loading on the coincidence output should be of high impedance.

One form of the invention will now be particularly described by way of example and with reference to the accompanying drawings in which:

Fig. 1 is a diagrammatic showing of a circuit according to the invention,

Fig. 2 shows the wave-form of a train of four pulses supplied from the pulse generator A of Fig. 1, Fig. 3 shows on the same time scale, the wave-form of a train of four pulses supplied from the pulse generator B of Fig. 1, Fig. 4 similarly shows the wave-form which appears at the anti-coincidence output of the circuit of Fig. 1, Fig. 5 shows the wave-form which appears at the coincidence output of this circuit, and Fig. 6 is a circuit diagram of a pulse transformer circuit which may be used as a pulse generator.

In the present example, that terminal 1 of each of the pulse generators A and B at which the output pulses in the respective trains are positive-going is connected to earth through a non-linear element $V_1$ or $V_2$, respectively. As shown in Fig. 1 these elements are diodes but they may be germanium crystals or some other metal-semiconductor contact of known type. The pulse generators A and B may be pulse transformers each driven from one of the two input pulse trains and provided with arrangements for D. C. restoration as described in the specification of co-pending application Serial Number 333,531. The circuit of such a pulse transformer is illustrated in Fig. 6 and comprises an amplifier triode valve $V_5$ to the grid of which an input pulse train is applied by way of a capacitor $C_1$ of approximately 100 $\mu f$. and a resistor $r$ the junction between the capacitor $C_1$ and the resistor $r$ being fed from a D. C. bias supply of —6 volts by way of a rectifier $G_1$.

The pulse train appears at the primary winding $T_p$ of a transformer, the secondary winding $T_s$ of which is connected in series with a rectifier $G_2$ such as a diode or germanium crystal and a load resistor $R_s$. The primary winding $T_p$ of the transformer is connected between the anode of the valve $V_5$ and a source of H. T. potential of the order of 150 volts. The rectifier $G_2$ ensures that only the positive part of the secondary waveform appears across the load resistor $R_s$, the positive and negative going terminals of which are indicated at 1 and 2 respectively.

Typical numerical values for the components of the circuit shown in Fig. 6 are as follows:

| | |
|---|---|
| Step-up ratio $n$ of transformer | 1.8:1. |
| Primary source impedance $R_p$ | 7,000 ohms. |
| Secondary load $R_s$ | 2,500 ohms. |
| Primary inductance L | 3.5 mh. |
| Secondary capacitive loading | 5–10 F. |

The primary source impedance $R_p$ may be obtained by choosing a valve for $V_5$ having an anode impedance of 7,000 ohms. A suitable valve is one having a slope of 5 ma./v. at an anode current of 8 ma. and which is capable of passing a current of 12 ma. at an anode potential of 50 v. without excessive dissipation and appreciable grid current.

The diodes $V_1$ and $V_2$ are connected so that they will conduct if the "positive-going" terminals 1 tend to go below (that is, more negative than) earth potential. Between these positive-going terminals are also connected two similar diodes $V_3$ and $V_4$ (or other non-linear elements) arranged in series opposition and from their junction J a resistive load R is connected to earth. These diodes $V_3$ and $V_4$ are connected so that each will pass current into the load R when the respective positive-going terminal rises above (that is, becomes more positive than) earth potential. The junction J of these diodes $V_3$ and $V_4$ constitutes the "anti-coincidence" output A/C. The negative-going terminals 2 of the two pulse generators A and B are connected together and constitute the "coincidence" output C, the loading on which point must be of high impedance.

In operation, when each pulse generator A and B generates a pulse at the same instant, the positive going terminals 1 of both generators tend to move positive, and the negative-going terminals 2 tend to move negative. The positive-going movement of the positive-going terminals 1 is resisted by the comparatively low impedance presented by the resistive load R and the diodes $V_3$ and $V_4$ in series with it but with the negative-going movement of the negative-going terminals 2 is only resisted by the high impedance load on the "coincidence" output C above mentioned, so that a negative pulse appears at the "coincidence" output C and only a negligibly small positive signal at the "anti-coincidence" output A/C. This is clearly shown in Figs. 2–5.

When a pulse is generated by only one generator, such as for example by the generator A, the negative-going terminal of this generator will be prevented from moving negative to earth by its connection to earth through the low impedance of the other generator B, the positive-going terminal 1 of which is prevented from moving negative to earth by its associated diode $V_2$. The positive-going terminal 1 of the excited generator A will therefore move positive to earth and will pass current into the resistive load R through the associated diode $V_3$; that is to say there will be a positive pulse in the "anti-coincidence" output A/C. This is also clearly shown in Figs. 2 to 5.

In a modification (not shown), by reversing the polarity of the connections to each generator A and B and each non-linear element $V_1$, $V_2$, $V_3$ and $V_4$ a circuit is obtained which will give a negative pulse from the "anti-coincidence" output A/C and a positive pulse from the "coincidence" output C when the appropriate input logical conditions are satisfied.

What I claim is:

1. An electrical circuit of the character referred to comprising in combination two pulse generators each driven by an input pulse train and each having a floating two-terminal output, one of said terminals of each generator being a positive-going terminal and the other of said terminals of each generator being a negative-going terminal, a non-linear element interposed between each positive-going terminal and earth and arranged to conduct only when the respective positive-going terminal tends to go below earth potential, two further non-linear elements connected in series opposition between said positive-going terminals and arranged to conduct only when the respective terminal tends to rise above earth potential, a resistive load connected between thte junction of said opposed non-linear elements and earth, a common non-grounded connection from the negative-going terminals of said pulse generators to constitute a coincidence output, and a connection from the junction of said opposed non-linear elements to constitute an anti-coincidence output.

2. A circuit according to claim 1, wherein the resistive load connected to earth from the junction of the series-connected non-linear elements presents a comparatively low impedance.

3. A circuit according to claim 1 wherein the loading on the coincidence output is of high impedance.

4. A circuit according to claim 1 wherein at least one of the pulse generators comprises a pulse transformer.

5. An electrical circuit of the character referred to comprising in combination two pulse transformers each driven by an input pulse train and each having a floating two terminal output, one of said terminals of each transformer being a positive-going terminal and the other of said terminals of each transformer being a negative-going terminal, a diode interposed between each positive-going terminal and earth and arranged to conduct only when the respective positive-going terminal tends to go below earth potential, two further diodes connected in series opposition between said positive-going terminals and arranged to conduct only when the respective terminal tends to rise above earth potential, a low impedance resistive load connected between the junction of said opposed diodes and earth, a common connection from the negative-going terminals of said pulse transfomers to constitute a coincidence output, a high impedance loading on said coincidence output and a connection from the junction of said opposed diodes to constitute an anti-coincidence output.

6. An electrical circuit of the character referred to comprising in combination two pulse generators each driven by an input pulse train and each having a floating two-terminal output, a non-linear element connected between the corresponding one terminal of each generator and earth with each of said elements arranged to be electrically conducting only when the associated one terminal assumes one polarity with respect to earth potential, two further non-linear elements connected in series opposition between said one terminals of said generators and arranged to be electrically conducting only when the respective one terminal assumes a polarity opposite to said one polarity with respect to earth potential, a resistive load connected between the junction of said opposed non-linear elements and earth, a connection from the junction of said opposed non-linear elements to constitute an anti-coincidence output and a common non-grounded connection from the other terminals of said generators to constitute a coincidence output.

References Cited in the file of this patent

UNITED STATES PATENTS

| | | |
|---|---|---|
| 2,535,303 | Lewis | Dec. 26, 1950 |
| 2,538,028 | Mozley | Jan. 16, 1951 |
| 2,549,780 | Earp | Apr. 24, 1951 |
| 2,670,445 | Felker | Feb. 23, 1954 |
| 2,693,533 | Femmer | Nov. 2, 1954 |